Oct. 16, 1956  W. H. BEAUBIEN  2,767,362
ELECTRIC MOTOR BRAKING SYSTEM
Filed Feb. 15, 1952
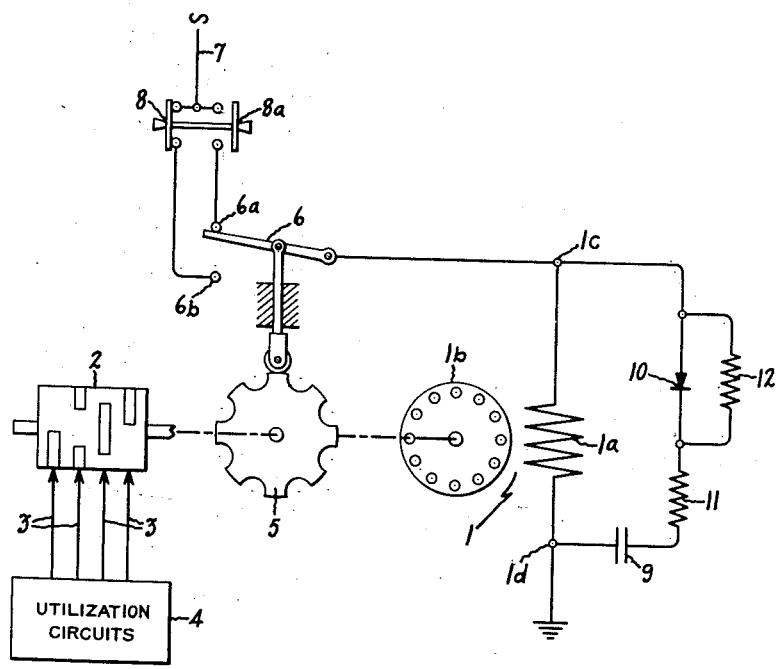
Inventor:
William H. Beaubien,
by [signature]
His Attorney.

United States Patent Office 2,767,362
Patented Oct. 16, 1956

2,767,362
ELECTRIC MOTOR BRAKING SYSTEM

William H. Beaubien, Lynn, Mass., assignor to General Electric Company, a corporation of New York Application February 15, 1952, Serial No. 271,799

2 Claims. (Cl. 318—212)

My invention relates to electric braking systems for alternating current motors, and more particularly to braking systems for alternating current motors of the type which run when energized from a source of alternating electric current supply and are braked to a stop when supplied with unidirectional current.

My invention is particularly adapted for use in conjunction with small alternating current motors used in control apparatus wherein the motor is recurrently started and stopped and must be accurately positioned upon stopping. Thus, in control applications where a motor is utilized either to measure time intervals or to accurately position a driven member when the motor is de-energized, deceleration and stopping of the motor must be accurately controlled in order to avoid errors due to variable coasting of the motor when de-energized.

Accordingly, therefore, it is a general object of my invention to provide a new and improved electric braking system for alternating current motors.

It is a more particular object of my invention to provide new and novel braking means for alternating current motors which eliminates time and positional stopping errors of a motor due to variable coasting upon de-energization.

It is a specific object of my invention to provide new and novel electric braking means for quickly and accurately stopping and positioning upon de-energization control motors utilized in driving program controllers or the like.

In carrying out my invention in one form a motor of the type which runs when energized from a source of alternating electric current supply and is braked to a stop when supplied with unidirectional current is connected to be energized in any desired well-known manner from an alternating current supply source. In addition, I provide a capacitor connected to be charged through a rectifier while the motor is running and to discharge through the motor when the motor is disconnected from the alternating current supply source. The unidirectional current thus supplied from the capacitor accurately brakes the motor to a stop.

My invention itself will be more fully understood and its various objects and advantages further appreciated by referring now to the following detailed specification taken in conjunction with the accompanying drawing, the single figure of which is a schematic circuit diagram of an electric motor braking system embodying my invention.

Referring now to the drawing, I have shown my invention as applied to an alternating current electric motor 1 of the squirrel cage induction type having a field winding 1a, an armature 1b and line terminals 1c and 1d. The motor 1 is connected to drive a program controller 2 of the rotatable contact drum type. The program controller 2 is shown provided with a plurality of drum contacts 3 connected to desired utilization circuits 4 indicated in block form. The motor 1 is connected to drive the drum 2 in a step-by-step fashion through a plurality of discrete switching positions by means of a self de-energizing arrangement including a star wheel 5 connected to actuate a two-position cam switch 6.

The motor 1, through its terminals 1c and 1d, is connected to be energized from any suitable source of alternating electric current supply, such as an alternating current line conductor 7. The motor energizing circuit includes the switch 6 and one or the other of a pair of mechanically interconnected push buttons 8, 8a. The manually operable push buttons 8 and 8a are arranged to move together and to remain in the position in which they were last placed. Thus, in the position shown in the drawing the motor 1 is de-energized but may be energized by closing the push button 8a. Upon such energization the motor 1 rotates the drum 2 to the next switching position and in so doing opens the upper contact 6a of the cam switch 6 and closes the lower contact 6b. In opening the upper contact 6a the motor 1 de-energizes itself because the push button 8 is now open due to closure of the push button 8a. The movement of the drum to the next switching position is accomplished in like manner by again closing the push button 8 to energize the motor through this push button and the cam switch contact 6b. The motor 1 then again de-energizes itself by moving the cam switch 6 to the position shown. Thus, the motor 1 may be recurrently energized by repeated actuations of the push buttons 8 and 8a, the motor de-energizing itself after each operation by the action of the cam switch 6.

For the purpose of accurately braking the motor 1 to a stop each time that the motor is de-energized, and thus accurately positioning the program drum 2 in its various switching positions, I permanently connect across the motor terminals 1a and 1b a braking circuit comprising a capacitor 9 connected in series circuit relation with a rectifier 10 through a resistor 11; and in shunt circuit relation with the rectifier 10 I permanently connect a resistor 12. It will now be evident that whenever the motor 1 is connected to the alternating current supply source the capacitor 9 is charged through the rectifier 10. After the capacitor is charged no further current flows in the braking circuit so long as the motor remains connected to the alternating current supply source. As soon as the motor 1 is disconnected from the source of alternating current supply, such as by operation of the cam switch 6, the capacitor 9 discharges through the resistors 11 and 12 and through the motor. The transient unidirectional current thus supplied to the motor 1 accurately brakes the motor to a stop.

It will now be evident to those skilled in the art that an alternating current motor provided with a braking system embodying my invention may be utilized either for accurate positioning control or for accurate time interval measurement. It will further be evident that the orientation of the rectifier 10, and thus the polarity to which the capacitor 9 is charged, is without significance in the operation of the circuit. Moreover, while the invention has been shown as applied to an alternating current motor of the squirrel cage induction type, it is equally applicable to other alternating current motors having electrically independent rotor and stator members, such as synchronous motors or the like, which run when connected to an alternating current supply source and are braked to a stop when supplied with unidirectional current.

Thus, while I have described a preferred embodiment of my invention by way of illustration, numerous modifications will occur to those skilled in the art, and I, therefore, wish to have it understood that I intend in the appended claims to cover all such modifications as fall within the true spirit and scope of my invention.

What I claim as new and desire to secure by Letters Patent of the United States is:

1. Electric switching apparatus comprising a pair of line terminals connectable to a source of alternating current supply, an alternating current electric motor having supply terminals and electrically independent rotor and stator members whereby said rotor member is braked to a stop when unidirectional current is supplied to its said terminals, means for completing and interrupting the connection between said motor terminals and said line terminals, a capacitor and a rectifier connected in series circuit relation with one another and permanently connected across said motor terminals, and a resistor permanently connected in shunt circuit relation with said rectifier, whereby said capacitor is charged through said rectifier when said motor is energized with alternating current and discharges unidirectional current through said resistor and said motor to brake said motor to a stop when said motor is disconnected from said source of alternating current supply.

2. In an electric braking system, an alternating current motor having electrically independent rotor and stator members and including a field winding, a capacitor and a rectifier permanently connected in series circuit relation with one another across the terminals of said field winding, and a resistor permanently connected in shunt circuit relation with said rectifier.

References Cited in the file of this patent

UNITED STATES PATENTS

| | | |
|---|---|---|
| 1,295,498 | Hewlett | Feb. 25, 1919 |
| 1,411,712 | Diehl | Apr. 4, 1922 |
| 2,168,373 | Thompson | Aug. 8, 1939 |
| 2,264,990 | Lindstrom | Dec. 2, 1941 |
| 2,434,919 | Girard | Jan. 27, 1948 |
| 2,445,806 | Snyder | July 27, 1948 |
| 2,477,953 | Berthiez | Aug. 2, 1949 |
| 2,512,354 | Marbury | June 20, 1950 |
| 2,565,334 | Weingarden | Aug. 21, 1951 |
| 2,702,877 | Noon | Feb. 22, 1955 |

FOREIGN PATENTS

| | | |
|---|---|---|
| 463,028 | Italy | Apr. 12, 1951 |